(12) United States Patent
De Block et al.

(10) Patent No.: US 12,377,437 B2
(45) Date of Patent: Aug. 5, 2025

(54) METHOD OF APPLYING A 2-COMPONENT ADHESIVE

(71) Applicant: STRONGBOND B.V., Dinxperlo (NL)

(72) Inventors: Rudolph Frank De Block, Dinxperlo (NL); Wilco Bernardus Wennekes, Dinxperlo (NL); Michel Menting, Dinxperlo (NL); Hendrik Jan Veneman, Dinxperlo (NL)

(73) Assignee: STRONGBOND B.V., Dinxperlo (NL)

( * ) Notice: Subject to any disclaimer, the term of this patent is extended or adjusted under 35 U.S.C. 154(b) by 445 days.

(21) Appl. No.: 17/785,688

(22) PCT Filed: Nov. 23, 2020

(86) PCT No.: PCT/NL2020/050734
§ 371 (c)(1),
(2) Date: Jun. 15, 2022

(87) PCT Pub. No.: WO2021/141486
PCT Pub. Date: Jul. 15, 2021

(65) Prior Publication Data
US 2023/0049666 A1      Feb. 16, 2023

(30) Foreign Application Priority Data
Jan. 8, 2020   (NL) .................................. 2024622

(51) Int. Cl.
*B05C 17/015*   (2006.01)
*B05C 17/005*   (2006.01)
(Continued)

(52) U.S. Cl.
CPC ...... *B05C 17/015* (2013.01); *B05C 17/00553* (2013.01); *B05C 17/00583* (2013.01);
(Continued)

(58) Field of Classification Search
CPC ............ B05C 17/015; B05C 17/00553; B05C 17/00583; C09J 201/10; C09J 11/06; C09J 11/04; C09J 2301/408
See application file for complete search history.

(56) References Cited

U.S. PATENT DOCUMENTS

| | | | |
|---|---|---|---|
| 4,009,778 A | | 3/1977 | Howell |
| 5,386,928 A | * | 2/1995 | Blette ...................... A61C 5/64 |
| | | | 222/327 |

(Continued)

FOREIGN PATENT DOCUMENTS

| | | | |
|---|---|---|---|
| EP | 0340657 A1 | 11/1989 | |
| EP | 2241517 A1 | * 10/2010 | ....... B05C 17/00553 |

OTHER PUBLICATIONS

Machine translation of EP-2241517-A1.*
International Search Report and Written Opinion for PCT Patent Application No. PCT/NL2020/050734 dated Mar. 23, 2021, 13 pages.

*Primary Examiner* — Jeremy Carroll
(74) *Attorney, Agent, or Firm* — AEON Law, PLLC; Adam L.K. Philipp; Charlotte E. Holoubek

(57) ABSTRACT

The present invention is in the field of an improved method of applying a two-component adhesive, wherein the adhesive is provided packaged in a foil, typically one and the same foil, a package comprising said adhesive and an adapted sealing gun, said adapted sealing gun, and specific uses of said package and sealing gun.

4 Claims, 3 Drawing Sheets

(51) Int. Cl.
*C09J 11/04* (2006.01)
*C09J 11/06* (2006.01)
*C09J 201/10* (2006.01)

(52) U.S. Cl.
CPC .............. *C09J 11/04* (2013.01); *C09J 11/06* (2013.01); *C09J 201/10* (2013.01); *C09J 2301/408* (2020.08)

(56) References Cited

U.S. PATENT DOCUMENTS

| | | | |
|---|---|---|---|
| 2002/0020718 A1* | 2/2002 | Summons | B65D 83/0072 222/327 |
| 2005/0198927 A1* | 9/2005 | Summons | B65D 81/325 53/434 |
| 2009/0302055 A1* | 12/2009 | Cadden | B05C 17/01 222/326 |
| 2011/0049189 A1 | 3/2011 | Strobel-Schmidt et al. | |
| 2011/0259914 A1 | 10/2011 | Lee et al. | |
| 2015/0028051 A1* | 1/2015 | Topf | B05C 5/0225 222/54 |
| 2016/0045928 A1 | 2/2016 | Frey | |
| 2018/0105722 A1* | 4/2018 | Tillack | C08G 18/6254 |

\* cited by examiner

GRLO-M5

GRLO-M5-PK

METHOD OF APPLYING A 2-COMPONENT ADHESIVE

RELATED APPLICATIONS

This application is a U.S. National Phase of PCT Patent Application No. PCT/NL2020/050734 having International filing date of Nov. 23, 2020, which claims the benefit of priority of Netherlands Patent Application No. 2024622 filed on Jan. 8, 2020. The entire contents of the above-referenced applications and of all priority documents referenced in the Application Data Sheet filed herewith are hereby incorporated by reference for all purposes.

FIELD OF THE INVENTION

The present invention is in the field of an improved method of applying a two-component adhesive, wherein the adhesive is provided packaged in a foil, typically one and the same foil, a package comprising said adhesive and an adapted sealing gun, said adapted sealing gun, and specific uses of said package and sealing gun.

BACKGROUND OF THE INVENTION

Sealants and adhesives which cure by water vapor from the air are widely known and applied. Most common 1C reactive sealants and adhesives, such as silicone, hybrid, and polyurethane sealants, work according to this curing principle. A problem may occur when water vapor is limited. This is for instance the case when two big surfaces, which are (in addition) impermeable for water vapor, are bonded together. In such a case only the edges will cure, whereas the central part may stay uncured. Also, the cure time may increase in case limited water vapor is present, as may be the case in winter time.

The above problem is usually solved by applying a 2C system where the booster or hardener may contain the necessary water or an alternative curing agent.

Many methods are described how to pack and mix the two parts of the 2C-system prior to the application. Often the two parts are packed separately, and are mixed prior to use. This has several disadvantages. For example, one must have both parts, and they must be mixed thoroughly in the desired quantities. Another possibility is a double cartridge from which both parts, using a special gun, in the desired amounts are pressed out more or less simultaneously, such as a static mixer. This special gun is often dedicated to the type of 2 component package that is used, making 2 component sealant guns complex, expensive and not uniformly applicable. This, again, has several disadvantages. Filling such a cartridge is expensive and so is the cartridge itself, usually being for a single use. A similar problem arises with cartridges for use in standard sealant guns, which are typically expensive one-way cartridges which are difficult and/or time consuming to fill. The cartridges generate a lot of waste and take more room in transport are therefore considered not to be a sustainable solution.

Incidentally some documents relate to provision of 2-component adhesives. U.S. Pat. No. 5,386,928 A recites a system for dispensing materials made of two components includes a side-by-side pair of collapsible separate tubes that fit within a barrel of a pressurized air applicator. As air is admitted into the barrel, the separate tubes simultaneously collapse to direct components in the separate tubes through outlet ports and into a static mixer where the components are mixed to a homogeneous mass. Each tube includes a relatively rigid front and rear end piece, and the end pieces are coupled together by pin elements for ease of handling and to facilitate dispensing. Due to the limitation of two separate tubes the tubes need to be more or less equal in volume to get en even flow of both components. Additionally they need (claim 1, column 7, line 15-18) a "relatively rigid end piece". The same is true for their second tube which also needs a "relatively rigid end piece" (claim 1, column 7, line 21-23), which again is absent in our invention. The manifold 40 (column 3, line 11), the relatively rigid end pieces 42 (column 3, line 13-14 and lines 60-63), including filling hole 43 (column 3 line 14), the front end pieces 44 (column 3, line 18-19 and 20-21 and 60-63) including the chamfered recessed outlet ports 46 are also redundant in our invention. It may be obvious that all these additional parts and constructions in the invention claimed in U.S. Pat. No. 5,386,928 make it fundamentally different and more prone to malfunction and economically and environmentally less attractive. US 2016/045928 A1 recites a dispensing apparatus includes two separate cylindrical sleeves, two shuttles slidingly disposed in the sleeves, push rods disposed in operable communication with the shuttles, and a piston, driven by pressurized gas, disposed in operable communication with the push rods. The cylindrical sleeves receive film pack bags having a common face plate that has an integrally formed discharge nosepiece having an internal partition that maintains separate flow streams from the film pack bags. US 2011/049189 A1 recites an extrusion tool for compound-containing containers, including an extrusion device and a cartridge for the container. The extrusion device includes an extrusion mechanism and a holding receptacle for the cartridge. The holding receptacle is bounded at the front end by an end plate and at the rear end by a housing wall of the extrusion mechanism. The cartridge is attached to the extrusion device such that it is pivotable about a pivot axis extending from the end plate to the housing wall, and is movable from an extrusion position to a loading position. And an extrusion device for such an extrusion tool, and to a cartridge for such an extrusion tool.

It is therefore an object of the present invention to provide an improved method of applying a two-component adhesive, wherein the adhesive is provided packaged in a foil, which overcomes drawbacks of the prior art methods, without jeopardizing functionality and advantages.

SUMMARY OF THE INVENTION

The present invention relates to an improved method of applying a 2-component adhesive, comprising providing a 2-component adhesive, wherein each of the 2-component adhesive is packaged in a single foil, preferably a plastic foil, such as a multilayer laminated foil, where-in the packaged two components are adjacent to one and another, and separated by the foil, providing a single air-pressure-driven sealing gun, such as a standard one-component sealant gun, inserting the packaged 2-component adhesive therein, and providing air-flow supply to the sealing gun, applying combined pressure by the sealing gun to both of the 2-components at the same time during a period of time, during application limiting air-flow supply, typically limiting from a start of application to an end of application, and driving the combined two-component adhesive out over said period of time. The present foil may comprise multiple layers, preferably 2-8 layers, such as 3-5 layers. At least one layer may be provided as protection, such as against impact, such as a PET or PA layer. At least one layer may be provided as a barrier, such as a fluid barrier, typically a moisture barrier, such as an Al layer. Also at least one base layer may be present, such as of PE, PP, and copolymers thereof (with other monomers). A foil is to be understood to relate to a relatively thin sheet, being flexible, and resilient to forces to be applied. It has now been found that the number of failing sausages can be reduced significantly, such as by 90%, by using an airflow reducer in the air supply system to the applicator, even if the leaking/failing of the welded seams does not start from the beginning of application.

A novel so-called 2C-sausage is developed, resembling two adjacent and packaged sausages, containing both components of the adhesive separate and in a single sausage, which can be emptied using a common application apparatus, such as a sealant gun, and, obviously, supply both parts of the adhesive or sealant in the desired ratio. With this type of sausage some further development was required. When loaded in the sealant gun/caulking gun the welded seams were often too weak and typically not reliable. Somewhere during application, the seams tended to give up, and as a result uncured product was spoiled within the applicator, typically the sealant gun. This led to product loss, not to mention time loss, in order to clean the applicator again. Also, the first (A) and second (B) component could leak to each other. In that case, premature cure took place inside the packaging and an uneven mixing ratio of A and B may occur at the outlet. Thereto the present, typically multilayer, single sausage with two separate compartments, a first compartment comprising the first (typically more voluminous) component and a second compartment comprising the second (typically less voluminous) component. Thereto a single foil was used, which was folded such that an extra compartment was formed, for the B component. The present foil preferably comprises a moisture barrier layer, such as an Al layer. All layers have typical thicknesses of 5-200 µm, each individually, such as 8-100 µm. It is noted that the present relatively high viscosities imply that a relatively high pressure is required to push each component out of the sausage and static mixer. The high pressures have made it a challenge to provide a suitable sausage for the given purpose, which challenge is now resolved.

In a second aspect the present invention relates to a package comprising a 2-component adhesive, wherein the 2-component adhesive comprises a first fluid selected from a silyl modified polymer, a hybrid polymer, a silane modified polymer, a silicone polymer, a polyurethane, a polysulfide, a polymethylmethacrylate, and combinations thereof, and a second fluid which comprising an activator, and combinations thereof, preferably wherein the first component:second component are provided in a v/v ratio of 95:5-50:50, and a single air-pressure-driven sealing gun with an air flow reducer.

In a third aspect the present invention relates to a single air-pressure-driven sealing gun for a 2-component adhesive, comprising an air flow controller. It is noted that an air flow controller is not the same as an (air) pressure valve or likewise (air) pressure controller.

In a fourth aspect the present invention relates to a use of the present package or the present sealing gun for improving at least one of bulk curing, applying a 2-component kit, reducing waste, preventing waste, and preventing malfunction.

In a fifth aspect the present invention relates to a package of a single foil, comprising a two-component adhesive, such as a package comprising 100 ml-2000 ml adhesive, preferably 150-1000 ml, such as 300-600 ml adhesive. The package is made of a laminate of at least two layers, typically at least three layers, such as 5-8 layers. Thereto a single foil was used, which was folded such that an extra compartment was formed, for the B component. The present foil preferably comprises a moisture barrier layer, such as an Al layer. The moisture barrier layer is preferably provided in the middle of the laminate. If a third or further layer is present, this layer is provided at the outside of the laminate. All layers have typical thicknesses of 5-200 µm, each individually. A first layer typically is 10-50 µm thick, a second 5-50 µm, and a third 10-50 µm. A first layer is typically selected from PE, PP, PET and PA, wherein the first layer is preferably heat sealable, a second layer is typically selected from moisture barrier layers, such as Al, and a third layer is typically selected from PE, PP, PET and PA. Typically the moisture barrier layer has one first layer at either side thereof, preferably two layers, such as a first and third layer, such as for protection. The layers may be attached to one and another by an adhesive. The present 2-component adhesive in the present package is provided as two sealed compartments, each compartment being enclosed by one and the same foil, and wherein the foil is provided with at least two welds in a longitudinal direction of the package therewith forming two adjacent compartments, and wherein the package comprises a closure at a top and bottom side thereof. The welds have a typical width of 0.2-10 mm, such as 1-4 mm. In view of the pressures to be applied, welding, and material properties of the adhesive the following characteristics for the layers to be applied typically are used: a tensile strength >1 MPa (ISO 527-2-2012), >50% elongation at break (ISO 527-1-2), <3 GPa flexural modulus (ISO 527), a density of 0.8-1.1 gr/cm$^3$ (ASTM D1505), a melting point of <200° C. (ISO 11357-1/-3), a melt flow rate @230° C. of 10 gr/10 min (ISO 1133), and a Charpy index of >50 kJ/m$^2$ (ISO 197), and combinations thereof.

Thereby the present invention provides a solution to one or more of the above-mentioned problems.

Advantages of the present description are detailed throughout the description.

DETAILED DESCRIPTION OF THE INVENTION

The present invention relates in a first aspect to a method of applying a 2-component adhesive, especially under circumstances where relatively large surfaces are bonded together, and where substantially no moisture from the air can enter the adhesive from outside, and thus the adhesive has to cure mainly by itself.

In an exemplary embodiment of the present method the adhesive may be applied to a surface of >100 cm$^2$, such as >500 cm$^2$, preferably wherein the adhesive may be applied to two surfaces of >100 cm$^2$, such as >500 cm$^2$.

In an exemplary embodiment of the present method the air flow may be limited to 20 l/min or less, preferably 10 l/min or less, more preferably 5 l/min or less.

In an exemplary embodiment of the present method air flow may be limited by a flow controller.

In an exemplary embodiment of the present method the air flow controller may be adjustable, such as by a screw, or wherein the air flow controller may be a fixed flow controller, preferably wherein the air flow controller is attached to the sealing gun.

In an exemplary embodiment of the present method the 2-component adhesive may be packaged in a single foil, wherein said foil comprises at least one seam enclosing each of the two-components individually.

In an exemplary embodiment of the present method the 2-component adhesive may comprise a first fluid selected from a silyl modified polymer, a hybrid polymer, a silane modified polymer, a silicone polymer, a polyurethane, a polysulfide, a polyacrylate, and combinations thereof.

In an exemplary embodiment of the present method the 2-component adhesive may comprise a second fluid which comprising an activator, and combinations thereof, preferably wherein the first component:second component are provided in a v/v ratio of 95:5-50:50.

In an exemplary embodiment of the present method the adhesive may comprise a first component (A) comprising (a1) 10-60 wt. % of a polymer selected from a silyl modified polymer, a hybrid polymer, a silicone polymer, a polyurethane, a polysulfide, a polyacrylate, and combinations thereof, (a2) 10-50 wt. % of filler, (a3) 0-30 wt. % of a plasticizer, (a4) 0-15 wt. % additives, (a5) 0.05-5 wt. % of a primary catalyst, preferably 0.1-3 wt. %, more preferably 0.5-2 wt. %, such as 1-2 wt. %, (a6) 0.00-10 wt. % of a co-catalyst, preferably 0.02-5 wt. %, more preferably 0.1-3 wt. %, even more preferably 0.25-2 wt. %, such as 0.5-1 wt. %, wherein the cocatalyst is preferably an aminopropyl tri-ethoxy silane (AMEO), (a7) 0.0-5 wt. % of a drying agent.

In an exemplary embodiment of the present method the adhesive may comprise as a second component (B) consisting of
(b1) 10-90 wt. % of a silyl modified polymer and/or hybrid polymer, preferably 30-70 wt. %, (b2) 10-70 wt. % of a molecular sieve with a pore diameter of 0.25-0.6 nm (2.5-6 Å), more preferably 30-50 wt. %, (b3) 1-25 wt. % water, preferably 1.5-20 wt. %, more preferably 2-12 wt. %, wherein all wt. % are based on a total weight of component A or B, respectively.

In an exemplary embodiment of the present method upon mixing the components (A) and (B) may be present in a volume ratio A:B of 100:3 to 1:1, preferably 20:1 to 2:1, more preferably 15:1 to 3:1, such as 10:1 to 5:1.

In an exemplary embodiment of the present method the primary catalyst may be selected from one or more of a tetravalent organotin compound, and reaction product of dioctyl tin oxide and a silicate compound.

In an exemplary embodiment of the present method the first component may have a viscosity of 100-10000 Pa·s (ISO 12092:2000, at T=23±0.5° C.), preferably 500-5000 Pa·s.

In an exemplary embodiment of the present method the second component may have a viscosity of 100-10000 Pa·s (ISO 12092:2000, at T=23±0.5° C.).

In an exemplary embodiment of the present method the molecular sieve may be an aluminosilicate material, such as a zeolite, such as a zeolite 3 Å (0.6 $K_2O$:0.40 $Na_2O$:1 $Al_2O_3$:2.0±0.1$SiO_2$:x$H_2O$), zeolite 4 Å (1$Na_2O$:1$Al_2O_3$:2.0±0.1$SiO_2$:x$H_2O$), and zeolite 5 Å (0.80CaO:0.20$Na_2O$:1$Al_2O_3$:2.0±0.1$SiO_2$:x$H_2O$).

In an exemplary embodiment of the present method the filler may be selected from chalk, precipitated chalk, coated precipitated chalk, silica, carbon black, and combinations thereof.

In an exemplary embodiment of the present method the drying agent may be selected from methoxy silanes and ethoxy silanes, preferably trimethoxy silanes and triethoxy silanes, such as vinyl-trimethoxy silane, and vinyl-tri-ethyoxy silane.

In an exemplary embodiment of the present method the plasticizer may be selected from benzoates, phthalates, terephthalates, polyols, hydrogenated versions of phthalates, terephthalates and benzoates, and combinations thereof.

In an exemplary embodiment of the present method the additives may be selected from catalysts, rheology control agents, pigments, pigment pastes, anti-oxidants (examples in the description), HALS, UV stabilizers, adhesion promotors, fungicide, bactericide, and combinations thereof.

In an exemplary embodiment of the present method the sealing gun comprises a plunger, wherein the air pressure is applied to the plunger, and wherein the plunger provides pressure to the foil.

In an exemplary embodiment of the present package the 2-component adhesive may be provided as two sealed compartments, each compartment being enclosed by one and the same foil, and wherein the foil may be provided with at least two welds in a longitudinal direction of the package therewith forming two adjacent compartments, and wherein the package may be closed at a top and bottom side thereof.

In an exemplary embodiment of the present package foils may be laminates of polyethylene (PE) or polypropylene (PP), polyethylene terephthalate (PET) or polyamide (PA), and aluminum (Al). During welding, the PE or PP is molten together. The Al forms the moisture barrier. The foils may be welded at welding temperature between 100° C. and 200° C., such as between 145° C. and 160° C. The foils may be welded during a welding time between 0.1 and 3 seconds, such as between 0.45 and 0.8 seconds.

In an exemplary embodiment of the present use is for sealing or bonding joints in transport vehicles, such as cars, trucks, busses, trains, vans, motorhomes, caravans, and trailers, ships, such as yachts, ships, and boats, or for adhering a first surface to a second surface.

The invention is further detailed by the accompanying figures and examples, which are exemplary and explanatory of nature and are not limiting the scope of the invention. To the person skilled in the art it may be clear that many variants, being obvious or not, may be conceivable falling within the scope of protection, defined by the present claims.

EXAMPLES/EXPERIMENTS

The invention although described in detailed explanatory context may be best understood in conjunction with the accompanying examples and figures.

Figure 1:
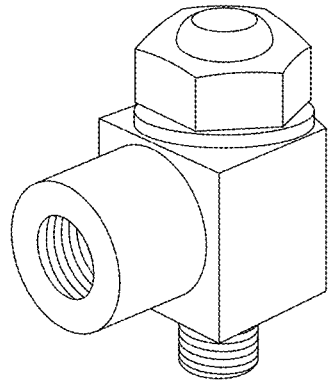
FIG. 1: Two examples of Festo GRLO flow controller.
Figure 1:
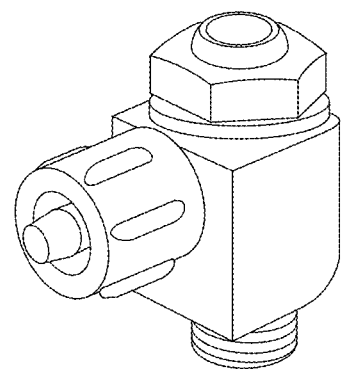
Figure 2:
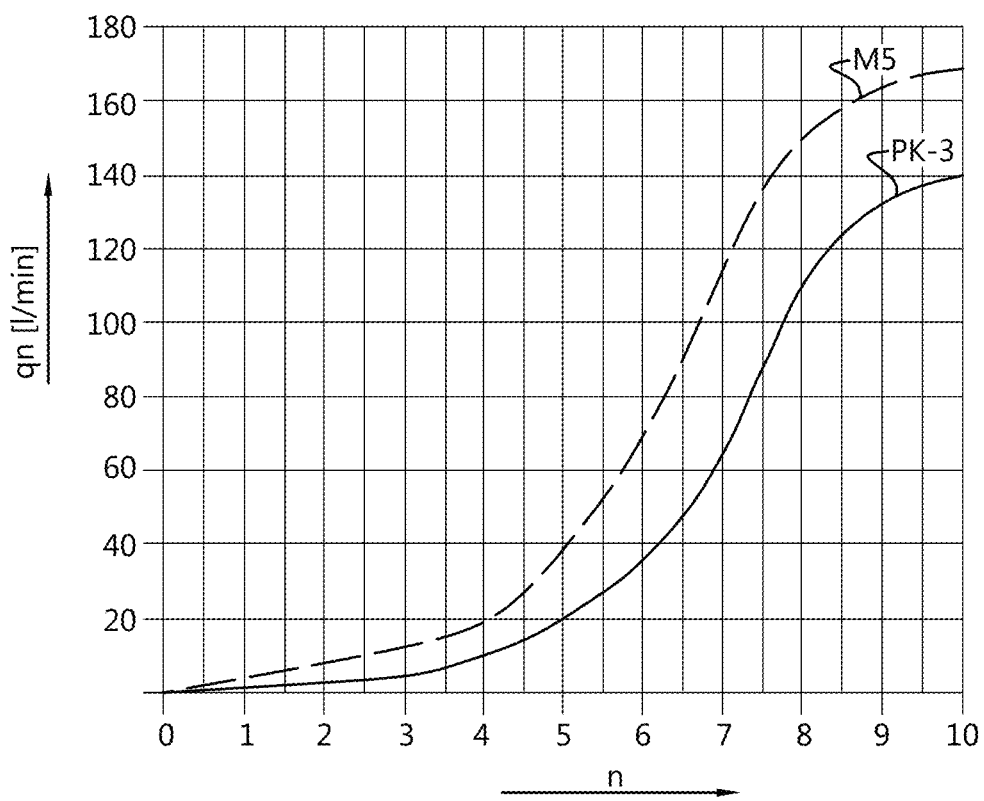
FIG. 2: flow rate as a function of screw turns on two examples of the Festo GRLO flow controller.

An example of suitable air-flow reducer is the Festo GRLO series (FIG. 1). FIG. 2 shows the reduced air flow as a function of screw turns from a fully closed position for two examples of flow reducers. It is noted that is rather difficult to reduce air-flow to very low values. The Festo device is considered to be something fundamentally different from pressure controllers, that are usually attached to a sealant gun. The flow reducer, reduces the air flow, but the full pressure is still found to build up. Without a flow reducer, the full pressure would be applied instantaneously, straining the relatively sensitive seals of the 2C sausage, often causing rupture. This has been an almost insurmountable problem in the development of the 2C sausage so far. When applying the present flow reducer, the same pressure is applied during a time period of approximately 5 seconds, after which, there is no influence of the flow reducer on the outflow of the product. Due to the short time delay at the beginning, the seams seem to be able to resist the pressure and rupture occurs far less frequently. The air flow with the optimum balance between time delay and occurrence of rupture, turned out to be approximately 10 l/min. This is a significant reduction of the unrestricted air flow of more than 100 l/min.

No reference was found to flow controllers being used for sealing guns, let alone for application of 2c sausages. Typically, on the contrary, flow control valves are considered to regulate the piston speed of pneumatic drives during advance and return strokes.

Figure 3:
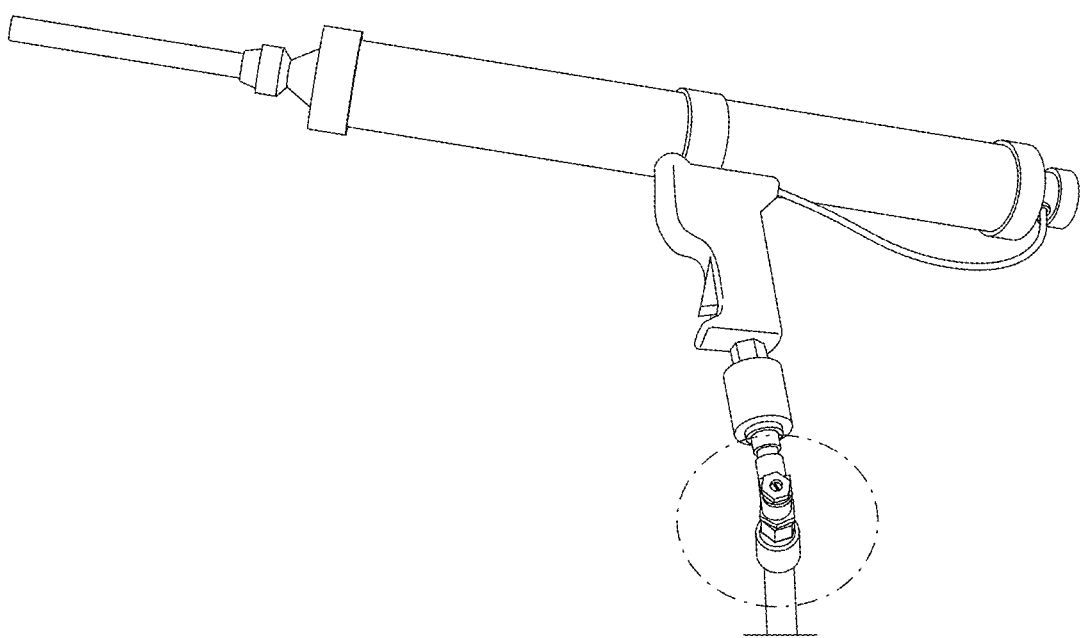
FIG. 3: Sealant gun with flow reducer (circle).

Many types of flow reducers are available. Some have restricted flow in both directions, others only in one. They differ in flow rate range and connection types. The example in FIG. 1 has a built-in screw to regulate the air flow, other types of valves are possible. Some types have fixed flow rates, although we were unable to find a flow reducer with a fixed flow rate of 10 l/min. Apparently, this is quite low for air flow rate standards. FIG. 3 shows a picture of such a flow reducer to a sealant gung extruding a 2c sausage.

Experimental

Test Results 2 k Flexible Packaging in Combination with Air Flow Controller

Figure 4A:
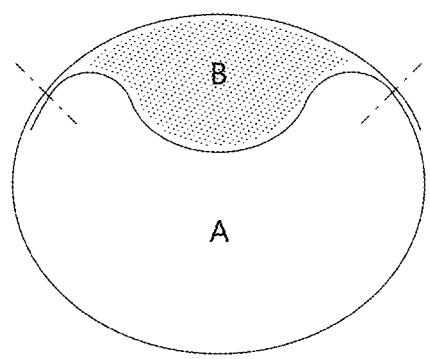
FIG. 4a,b Cross section of 2 component flexible packaging: schematic (A) and picture (B).
Figure 4B:
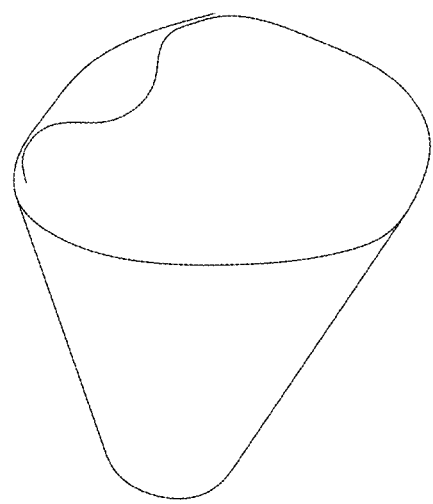
Figure 5:
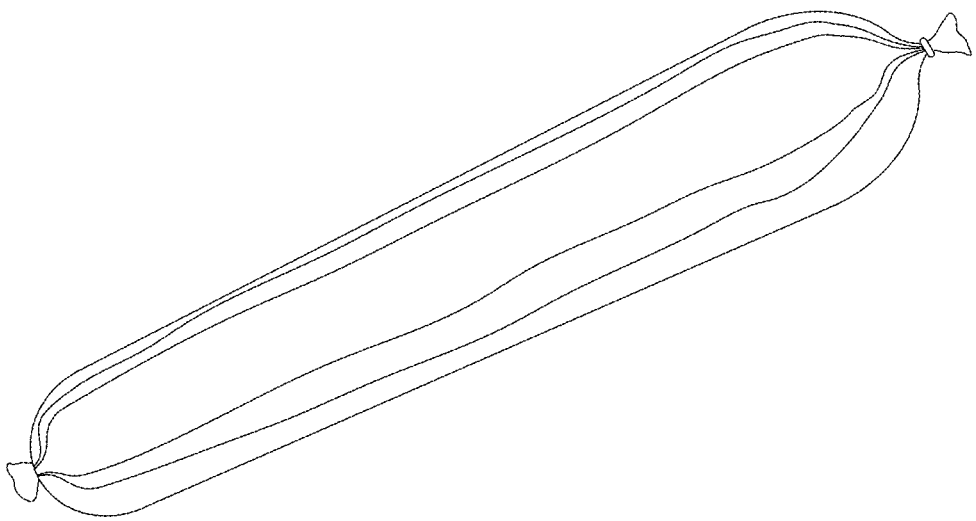
FIG. 5 shows a picture of a 600 ml 2c packaging.

The applicant Saba has developed a new adhesive packaging for its 2 component MS based sealant. FIG. 4A shows a schematic representation of the cross section of such a 2-component package. The dotted lines indicate the location of the welds. The package is made from a single foil. FIG. 4B is a picture of a cross section of such a packaging. FIG. 5 is a picture of the whole 600 ml flexible packaging. The two welding seams are visible on top of the packaging.

The welding temperature and welding time are varied for three types of foil. All foils are laminates of polyethylene (PE) or polypropylene (PP), polyethylene terephthalate (PET) or polyamide (PA) and aluminum (Al). During welding, the PE or PP is molten together. The Al forms the moisture barrier. The three foils do not come from the same supplier. Therefore, there may be differences in type of PE and adhesive used for lamination. The welding temperature was varied between 145° C. and 160° C. and the welding time between 0.45 and 0.8 seconds.

During welding, the packages are simultaneously filled with first (A) component (such as an MS based product) and second (B) component (paste containing the water). The packages are mechanically closed with a clip on both ends. The volume ratio of A:B is 100:10 in the tested packaging.

Figure 6:
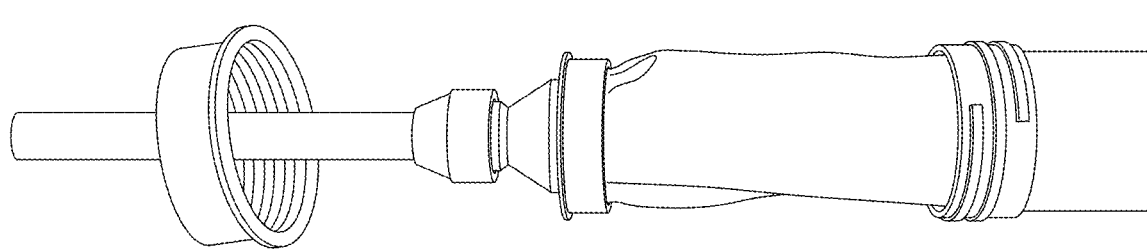
FIG. 6 shows a sealant gun containing the flexible packaging and the static mixer.

To test the flexible packaging, the clip is removed from one side. The package is placed in a standard 1 component air pressure driven sealant gun. The open side of the packaging is pointed outside of the gun. A static mixer is attached to an adapter and this is placed on top of the flexible packaging. These elements can be seen in FIG. 6. The adapter and packaging are kept in place by the sealant gun's own locking mechanism; this is the black ring from FIG. 3. Tests were performed with and without an air flow controller. When used, the air flow controller is set up to allow a maximum air flow of 10 L/min and is attached directly to the air inlet of the sealant gun.

During testing, 8 bar air pressure is applied by the sealant gun and the mixed sealant (A and B) comes out of the static mixer. This is continued until the packaging does not contain any adhesive anymore. The empty packaging is then examined for holes along the two welding seams to assess if the seams survived the extrusion process.

Results

The results for foil A, B and C are shown in Tables 1, 2 and 3, respectively. Multiple packages were tested for each time/temperature combination and the results are expressed as % of packaging that did not contain any holes in the welding seams after being exposed to 8 bar of pressure for the time needed to fully empty the packaging. Results are given for the tests carried out with and without the use of a flow controller at the air inlet of the sealant gun.

From Tables 1-3 can be concluded that there is always some failure of the welding seams for all three foils and for all time/temperature combinations when no flow controller is used. When the flow controller is placed between the pressurized air source and the sealant gun, holes in the seams are less frequent. There are several time/temperature combinations where no failure of the seams was observed at all.

TABLE 1

Results for foil A; effect of welding temperature, welding time and the use of a flow controller.

| T/t | With flow controller (% of packages without hole) | Without flow controller (% of packages without hole) |
| --- | --- | --- |
| 150 | | |
| 0.45 | 58.3 | 33.3 |
| 0.55 | 100 | 28.6 |
| 158 | | |
| 0.45 | 100 | 86.4 |
| 0.5 | 100 | 82.8 |

TABLE 2

Results for foil B; effect of welding temperature, welding time and the use of a flow controller.

| T/t | With flow controller (% of packages without hole) | Without flow controller (% of packages without hole) |
| --- | --- | --- |
| 145 | | |
| 0.6 | 90 | 0 |
| 0.75 | 90.9 | 0 |
| 0.85 | 42.9 | 0 |
| 150 | | |
| 0.6 | 75 | 0 |
| 0.75 | 70 | 0 |
| 0.8 | 75 | 0 |
| 158 | | |
| 0.45 | 100 | 0 |
| 160 | | |
| 0.6 | 62.5 | 0 |

TABLE 3

Results for foil C; effect of welding temperature, welding time and the use of a flow controller.

| T/t | | With flow controller (% of packages without hole) | Without flow controller (% of packages without hole) |
|---|---|---|---|
| 145 | | | |
| | 0.65 | 0 | 0 |
| 150 | | | |
| | 0.6 | 87.5 | 50 |
| | 0.65 | 96.7 | 83.3 |
| | 0.75 | 100 | 0 |
| | 0.8 | 100 | 0 |
| 160 | | | |
| | 0.65 | 100 | 0 |

Examples of Foils

In an example the flexible polymeric film layer comprises one or more polymers selected from polypropylenes, polyethylenes, polyethylene terephthalates, polyamides, nylons, or combinations thereof. It is noted that many other polymers, copolymers, and combinations thereof may also be suitable.

A number of polymer layers on either side of the moisture barrier (typically aluminum, but can be any other material with sufficiently low moisture permeation properties) is typically 1 or 2, preferably 2. The outer layers are best heat sealable. The multiple layers are typically connected to one another by an adhesive (polyurethane or other suitable adhesive). The thickness of the adhesive is typically a few microns.

Some foils used so far are the following stacks (thickness in µm):

| | SABA1 | SABA2 | SABA3 |
|---|---|---|---|
| PE | 30 | 40 | 60 |
| PET | 12 | none | 12 |
| Alu | 6.35 | 12 | 8 |
| PET | 12 | none | 12 |
| PE | 30 | 40 | 60 |

The invention claimed is:

1. A package for use in a single air pressure driven sealing gun, the package comprising a 2-component adhesive, the 2-component adhesive comprising a first component A and a second component B wherein the package comprises two sealed compartments, each compartment being enclosed by a multilayer foil, which is one and the same multilayer foil, wherein the 2-component adhesive further comprises a first fluid selected from a silyl modified polymer, a hybrid polymer, a silane modified polymer, a silicone polymer, a polyurethane, a polysulfide, a polymethylmethacrylate, and combinations thereof, and a second fluid which comprises an activator, wherein the 2-component adhesive comprises the first component: and the second component in a volume ratio of 95:5-50:50.

2. The package according to claim 1, wherein the package comprises at least two welds connecting a top side and a bottom side of the foil in a longitudinal direction of the package therewith forming the two sealed adjacent compartments, and wherein the package comprises a closure at a top and bottom side thereof.

3. The package according to claim 2, wherein the foil comprises multiple layers, and
   wherein the foil comprises at least one protection layer, and
   wherein the at least one protection layer is heat sealable, and
   wherein the foil comprises at least one base layer, and
   wherein the foil comprises at least one fluid barrier layer,
   wherein the layers of the foil each individually
   have a thickness of 5-200 µm, and
   wherein welds have a width of 0.2-10 mm, and
   wherein the welds are welded at a temperature between 100° C. and 200° C., and
   wherein the welds are welded during a welding time between 0.1 and 3 seconds, and
   wherein the layers of the foil each individually
   have a tensile strength >1 Mpa (ISO 527-2-2012), and >50% elongation at break (ISO 527-1-2), and <3Gpa flexural modulus (ISO 527), and a density of 0.8-1.1 gr/cm' (ASTM D1505), and, a melting point of <200° C. (ISO 11357-1/-3), and a melt flow rate @230° C. of 10 gr/10 min (ISO 1133), and, a Charpy index of >50 KJ/m$^2$ (ISO 197).

4. A single air-pressure-driven sealing gun comprising a package according to claim 1,
   wherein the package comprises two sealed compartments, each compartment being enclosed by one and the same multilayer foil, wherein the 2-component adhesive comprises a first fluid selected from a silyl modified polymer, a hybrid polymer, a silane modified polymer, a silicone polymer, a polyurethane, a polysulfide, a polymethylmethacrylate, and combinations thereof, and a second fluid winch comprising an activator, and combinations thereof, wherein the 2-component adhesive comprises the first component; and second component in a volume ratio of 95:5-50:50, wherein the package comprises at least two welds connecting a top side and a bottom side of the foil in a longitudinal direction of the package therewith forming the two sealed adjacent compartments, and wherein the package comprises a closure at a top and bottom side thereof,
   wherein the sealing gun is a one-component sealant gun comprising an air inlet, and an air flow controller, wherein the air flow controller is attached directly to the air inlet of the sealant gun, and wherein the air flow controller is adapted to allow a maximum air flow of 10 1/min, and wherein the air flow controller is selected from an adjustable air flow controller and from a fixed flow controller.

* * * * *